(12) United States Patent
Walton et al.

(10) Patent No.: US 8,194,563 B2
(45) Date of Patent: *Jun. 5, 2012

(54) CLOSED-LOOP RATE CONTROL FOR A MIMO COMMUNICATION SYSTEM

(75) Inventors: J. Rodney Walton, San Diego, CA (US); Mark S. Wallace, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/767,648

(22) Filed: Apr. 26, 2010

(65) Prior Publication Data

US 2010/0208839 A1    Aug. 19, 2010

Related U.S. Application Data

(63) Continuation of application No. 11/281,298, filed on Nov. 16, 2005.

(60) Provisional application No. 60/628,568, filed on Nov. 16, 2004.

(51) Int. Cl.
*H04B 7/00* (2006.01)

(52) U.S. Cl. .......... 370/252; 370/310; 370/468

(58) Field of Classification Search .......... None
See application file for complete search history.

(56) References Cited

U.S. PATENT DOCUMENTS

| | | | |
|---|---|---|---|
| 6,711,150 B1 | 3/2004 | Vanghi | |
| 6,785,341 B2 | 8/2004 | Walton et al. | |
| 2002/0191564 A1 | 12/2002 | Kuo | |
| 2003/0076797 A1 * | 4/2003 | Lozano | 370/334 |
| 2003/0165189 A1 | 9/2003 | Kadous | |
| 2004/0120411 A1 * | 6/2004 | Walton et al. | 375/260 |
| 2004/0264588 A1 * | 12/2004 | Song et al. | 375/260 |
| 2005/0025040 A1 | 2/2005 | Tang et al. | |

FOREIGN PATENT DOCUMENTS

CA    2500164    5/2004

(Continued)

OTHER PUBLICATIONS

Boumard, S., "Novel noise variance and SNR estimation algorithm for wireless MIMO OFDM systems," Global Telecommunications Conference, 2003. GLOBECOM '03. IEEE vol. 3, Dec. 1-5, 2003 pp. 1330-1334 vol. 3, San Francisco, NY USA vol. 7.

(Continued)

*Primary Examiner* — Kevin C Harper

(74) *Attorney, Agent, or Firm* — Qualcomm Patent Group; James H. Yancey, Jr.

(57) ABSTRACT

In a MIMO system, rate control is achieved with an inner loop that selects rates for data streams sent via a MIMO channel and an outer loop that regulates the operation of the inner loop. For the inner loop, SNR estimates are obtained for each data stream based on received pilot symbols and/or received data symbols. An effective SNR is derived for each data stream based on the SNR estimates, a diversity order, a MIMO backoff factor, and an outer loop backoff factor for the data stream. The rates are then selected for the data streams based on the effective SNRs for the data streams. The outer loop adjusts the outer loop backoff factor for each data stream based on the performance (e.g., packet errors and/or decoder metrics) for the data stream.

16 Claims, 3 Drawing Sheets

FOREIGN PATENT DOCUMENTS

WO  WO03075479  9/2003

OTHER PUBLICATIONS

International Search Report—PCT/US2005/041696—European Patent Office—May 29, 2006.

Kadous, T., "COSFA: an efficient spatial multiplexing scheme for rate adaptive systems," Vehicular Technology Conference, 2003. VTC 2003—Fall 2003. 2003 IEEE 58th vol. 3, Oct 6-9, 2003 pp. 1782-1787 vol. 3, Piscataway, NJ USA.

Pauluzzi, D.R., et al, "A Comparison of SNR estimation techniques in the AWGN channel," Communications, Computers, and Signal Processing, 1995. Proceedings. IEEE Pacific Rim Conference on May 17-19, 1995 pp. 36-39, Victoria, British Columbia.

Stege, M. et al., "Successive Interference cancellation and its implications for the design of layered mimoalgorithms," Information Theory, 2003. Proceedings. IEEE International Symposium on Jun. 29-Jul. 4, 2003 pp. 298-298, Yokohama, Japan.

Written Opinion—PCT/US2005/041696—European Patent Office, Munich—May 29, 2006.

* cited by examiner

CLOSED-LOOP RATE CONTROL FOR A MIMO COMMUNICATION SYSTEM

CLAIM OF PRIORITY

This application is a continuing application of, and claims the benefit of priority from, U.S. patent application Ser. No. 11/281,298, entitled "Closed-Loop Rate Control for a MIMO Communication System" and filed on Nov. 16, 2005, which claims the benefit of priority from U.S. Provisional Patent Application Ser. No. 60/628,568, entitled "Closed-Loop Rate Adaptation for a MIMO Communication System" and filed Nov. 16, 2004, both of which are assigned to the assignee of this application and are fully incorporated herein for all purposes.

BACKGROUND

1. Field

The present disclosure relates generally to data communication, and more specifically to techniques for performing rate control for a communication system.

2. Background

A multiple-input multiple-output (MIMO) communication system employs multiple (T) transmit antennas at a transmitting station and multiple (R) receive antennas at a receiving station for data transmission. A MIMO channel formed by the T transmit antennas and the R receive antennas may be decomposed into S spatial channels, where $S \leq \min\{T, R\}$. The S spatial channels may be used to transmit data in a manner to achieve higher overall throughput and/or greater reliability.

The spatial channels may experience different channel conditions (e.g., different fading, multipath, and interference effects) and may achieve different signal-to-interference-and-noise ratios (SNRs). The SNR of each spatial channel determines its transmission capability, which is typically quantified by a particular data rate that may be reliably transmitted on the spatial channel. If the SNR varies from spatial channel to spatial channel, then the supported data rate also varies from spatial channel to spatial channel. Furthermore, the channel conditions typically vary with time, and the data rates supported by the spatial channels also vary with time.

Rate control, which is also called rate adaptation, is a major challenge in a MIMO system that experiences varying channel conditions. Rate control entails controlling the data rate of each data stream based on the channel conditions. The goal of rate control should be to maximize the overall throughput on the spatial channels while meeting certain performance objectives, which may be quantified by a particular packet error rate (PER) and/or some other criteria.

There is therefore a need in the art for techniques to effectively perform rate control in a MIMO system.

SUMMARY

Techniques for performing rate control in a MIMO system are described herein. In an embodiment, rate control for at least one data stream transmitted via a MIMO channel is achieved based on (1) an inner loop that selects at least one rate for the at least one data stream and (2) an outer loop that provides at least one parameter used by the inner loop to select the at least one rate. A rate may also be referred to as a packet format, a mode, a data rate, a code rate, a modulation scheme, a coding and modulation scheme, a modulation coding set (MCS), and so on. The outer loop regulates the operation of the inner loop.

In an embodiment, for the inner loop, at least one SNR estimate is initially obtained for each data stream based on received pilot symbols and/or received data symbols for the data stream. The SNR estimates may be derived based on a receiver spatial processing technique used to recover the at least one data stream. A diversity order, a MIMO backoff factor, and an outer loop backoff factor are determined for each data stream and used to derive an effective SNR for the data stream, as described below. At least one rate is then (individually or jointly) selected for the at least one data stream based on the at least one effective SNR for the at least one data stream. A transmission mode may also be selected for use from among multiple transmission modes (e.g., steered, unsteered, and spatial spreading modes) associated with different transmitter spatial processing. In an embodiment, the outer loop adjusts the outer loop backoff factor for each data stream based on the performance (e.g., packet status and/or decoder metrics) for the data stream.

Various details of the rate control are described below. Various aspects and embodiments of the invention are also described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The rate control techniques described herein may be used for various MIMO systems such as a single-carrier MIMO system with a single frequency subband, a multi-carrier MIMO system with multiple subbands, a single-carrier MIMO system with multiple subbands, and so on. Multiple subbands may be obtained with orthogonal frequency division multiplexing (OFDM), single-carrier frequency division multiple access (SC-FDMA), other modulation techniques, or some other construct. OFDM partitions the overall system bandwidth into multiple (K) orthogonal subbands, which are also called tones, subcarriers, bins, and so on. With OFDM, each subband is associated with a respective subcarrier that may be modulated with data. SC-FDMA similarly partitions the overall system bandwidth into K subbands. In general, modulation symbols are sent in the frequency domain with OFDM and in the time domain with SC-FDMA.

For a MIMO system with a single subband, S spatial channels are available for data transmission. For a MIMO system with multiple (K) subbands, S spatial channels are available for each of the K subbands. For any MIMO system, M transmission channels may be formed with all of the spatial channels for all of the available subband(s), where $M \geq 1$. In general, each transmission channel may correspond to one or multiple spatial channels for one or multiple subbands in a MIMO system. For example, a transmission channel may correspond to one or multiple spatial channels in a MIMO system with a single subband. As another example, a transmission channel may correspond to one or multiple wideband spatial channels in a MIMO system with multiple subbands, where each wideband spatial channel includes one spatial channel for each of the K subbands. A transmission channel may also be called a parallel channel, a data channel, a traffic channel, a physical channel, and so on.

For clarity, much of the following description is for a MIMO system that utilizes OFDM or SC-FDMA. Also for clarity, the following description assumes that one data stream is sent on each transmission channel. The terms "data stream" and "transmission channel" are thus interchangeable for much of the description below. The number of data streams may be configurable and may be selected based on channel conditions and/or other factors.

Figure 1:
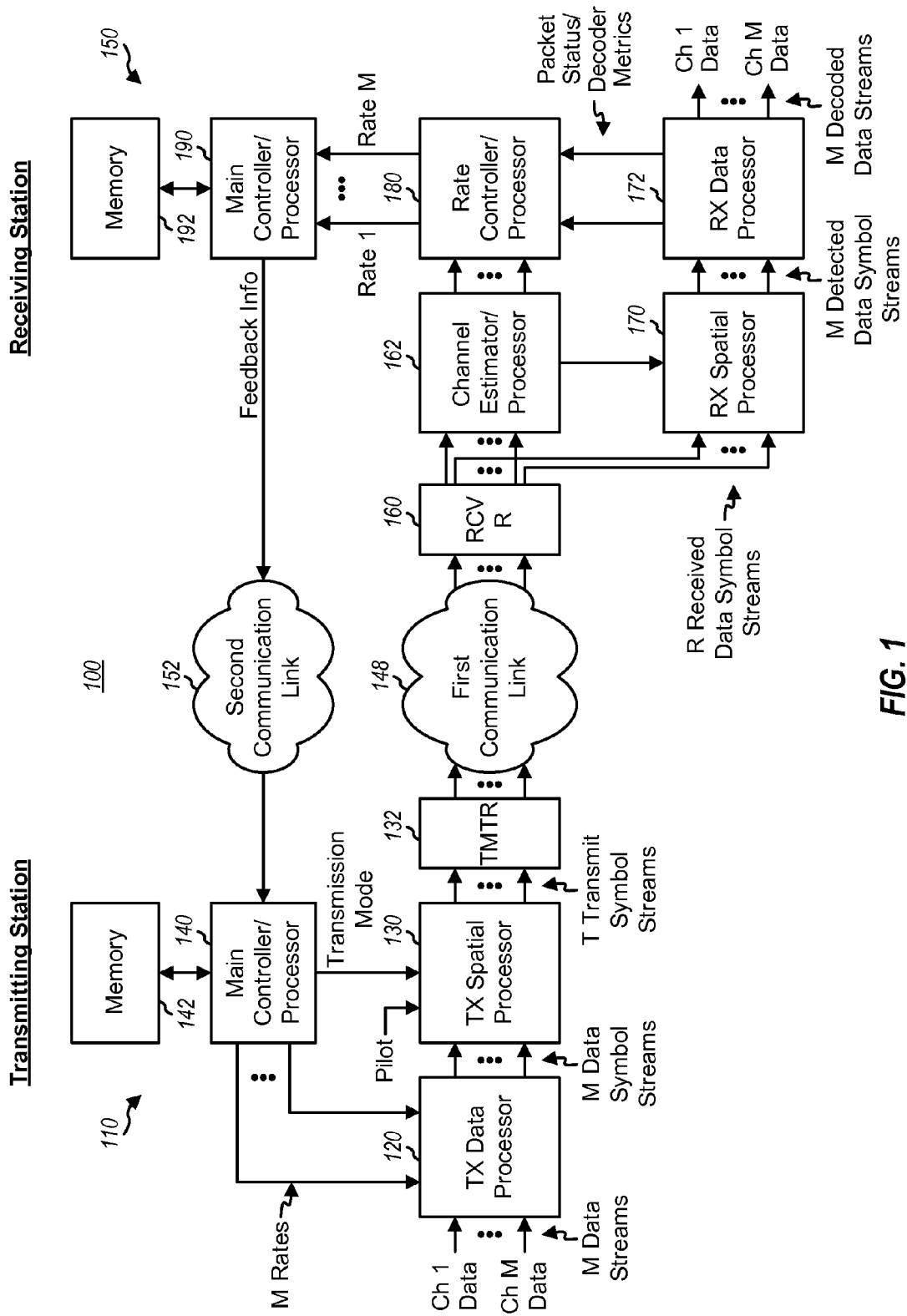
FIG. 1 shows a block diagram of a transmitting station and a receiving station.

The illustration of FIG. 1 shows a block diagram of a transmitting station 110 and a receiving station 150 in a MIMO system 100. For downlink transmission, transmitting station 110 may be an access point, receiving station 150 may be a user terminal, and the first and second communication links are downlink and uplink, respectively. For uplink transmission, transmitting station 110 may be a user terminal, receiving station 150 may be an access point, and the first and second communication links are uplink and downlink, respectively. FIG. 1 shows data transmission with closed-loop rate control for M data streams, where $M \geq 1$.

At transmitting station 110, a main controller/processor 140 determines a rate for each data stream based on information available for that data stream. This information may include feedback information provided by receiving station 150 and/or information (e.g., channel estimates) obtained by transmitting station 110. The rate for each data stream may indicate a specific data rate, a specific coding scheme or code rate, a specific modulation scheme, a packet size, and/or other parameters to use for the data stream. Main controller/processor 140 generates various coding and modulation controls based on the rates for the M data streams.

A transmit (TX) data processor 120 receives M data streams and the coding and modulation controls for these data streams. TX data processor 120 processes (e.g., formats, encodes, interleaves, and symbol maps) each data stream in accordance with the selected rate and generates a stream of data symbols, which are modulation symbols for data. TX data processor 120 provides M data symbol streams.

A TX spatial processor 130 receives and multiplexes the M data symbol streams with pilot symbols, which are modulation symbols for pilot. A pilot is a reference transmission that is known a priori by receiving station 150 and is used to perform various functions such as channel estimation, acquisition, frequency and timing synchronization, data demodulation, and so on. TX spatial processor 130 performs spatial processing on the data and pilot symbols, if applicable, and provides T transmit symbol streams for the T transmit antennas.

A transmitter (TMTR) 132 processes the T transmit symbol streams in a manner specified by the system. For example, transmitter 132 may perform OFDM or SC-FDMA modulation if the MIMO system utilizes OFDM or SC-FDMA, respectively. Transmitter 132 generates T modulated signals for the T transmit symbol streams. The T modulated signals are transmitted from T transmit antennas and via first communication link 148 to receiving station 150. First communication link 148 distorts each modulated signal with a particular channel response and further degrades the modulated signal with additive white Gaussian noise (AWGN) and possibly interference from other transmitting stations.

At receiving station 150, R receive antennas receive the T transmitted signals and provide R received signals. A receiver (RCVR) 160 conditions and digitizes the R received signals and further processes the samples in a manner complementary to the processing performed by transmitter 132. Receiver 160 provides received pilot symbols to a channel estimator/processor 162 and R streams of received data symbols to a receive (RX) spatial processor 170. Channel estimator/processor 162 estimates the MIMO channel response for first communication link 148 and provides channel estimates to RX spatial processor 170.

RX spatial processor 170 performs receiver spatial processing (or spatial matched filtering) on the R received data symbol streams based on the channel estimates from channel estimator/processor 162 and provides M detected symbol streams, which are estimates of the M data symbol streams sent by transmitting station 110. An RX data processor 172 processes (e.g., symbol demaps, deinterleaves, and decodes) the M detected symbol streams in accordance with the M rates selected for these streams and provides M decoded data streams, which are estimates of the M data streams sent by transmitting station 110. RX data processor 172 may further provide the status of each received data packet and/or decoder metrics for each decoded data stream.

For rate control, channel estimator/processor 162 may process the received pilot symbols to obtain SNR estimates, noise variance estimates, and so on. The noise variance is the noise floor observed at receiving station 150 and includes the channel noise, receiver noise, interference from other transmitting stations, and so on. RX data processor 172 may also derive SNR estimates based on the detected data symbols. A rate controller/processor 180 receives various types of information such as, for example, the SNR estimates from channel estimator 162, the SNR estimates, packet status and/or decoder metrics from RX data processor 172, and so on. Rate controller/processor 180 selects a suitable rate for each data stream based on the received information and provides M selected rates, Rate 1 through Rate M, for the M data streams.

A main controller/processor 190 receives the M selected rates from rate controller/processor 180 and the packet status from RX data processor 172. Main controller/processor 190 generates feedback information, which may include the M selected rates, acknowledgments (ACKs) and/or negative acknowledgments (NAKs) for received data packets, and/or other information. The feedback information is sent via second communication link 152 to transmitting station 110. Transmitting station 110 uses the feedback information to adjust the processing of the M data streams sent to receiving station 150. For example, transmitting station 110 may adjust the code rate and/or modulation scheme for each of the M data streams sent to receiving station 150. The feedback information increases the efficiency of the system by allowing data to be transmitted at the best-known settings supported by first communication link 148.

For the embodiment shown in FIG. 1, receiving station 150 performs channel estimation and rate selection and sends the M rates for the M data streams back to transmitting station 110. In another embodiment, transmitting station 110 performs channel estimation and rate selection based on feedback information sent by receiving station 150 and/or other information obtained by transmitting station 110. In yet another embodiment, transmitting station 110 and receiving station 150 jointly perform channel estimation and rate selection.

Figure 2:
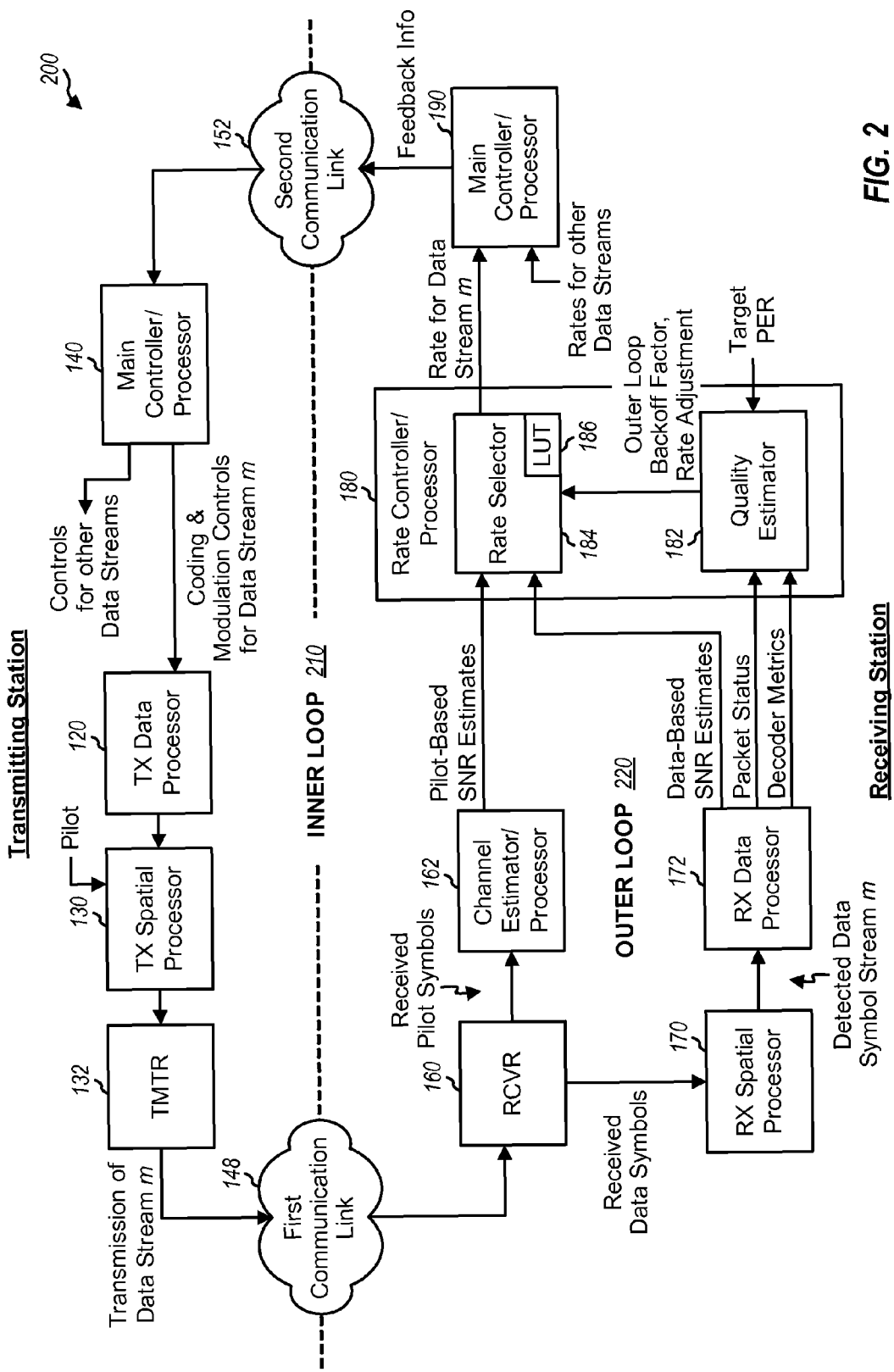
FIG. 2 shows a rate control mechanism with an inner loop and an outer loop.

The illustration of FIG. 2 shows a block diagram of an embodiment of a closed-loop rate control mechanism 200, which includes an inner loop 210 and an outer loop 220. For clarity, the operation of inner loop 210 and outer loop 220 for only one data stream m is shown in FIG. 2. In an embodiment, one inner loop and one outer loop are maintained for each of the M data streams. In another embodiment, one inner loop and/or one outer loop are maintained for multiple (e.g., all M) data streams.

Inner loop 210 tracks variations in the rate for each data stream due to channel conditions. Inner loop 210 can track instantaneous changes in the MIMO channel if receiving station 150 can send feedback information to transmitting station 110 faster than the coherence time of the MIMO channel. Inner loop 210 is typically driven by parameters that are observable at the physical layer, such as received SNRs. Inner loop 210 may operate with pilot-based SNR estimates and/or data-based SNRs estimates, which may be computed as described below.

Outer loop 220 corrects for packet errors detected by CRC failures. With a properly designed inner loop 210, packet errors should occur infrequently at a given target PER. For example, if the target PER is 1%, then only one packet should be received in error out of every 100 packets that are transmitted. Outer loop 220 typically has a slower response time than inner loop 210. Outer loop 220 may be viewed as a governor for inner loop 210 to ensure that the rate selected by inner loop 210 for each data stream can achieve the target PER.

For inner loop 210, channel estimator/processor 162 estimates the SNR of data stream m based on received pilot symbols and provides pilot-based SNR estimates for data stream m. RX data processor 172 estimates the SNR of data stream m based on detected data symbols for data stream m and provides data-based SNR estimates for data stream m. RX data processor 172 may also provide packet status and/or decoder metrics for data stream m.

A rate selector 184 within rate controller/processor 180 receives the SNR estimates for data stream m and other information such as, e.g., the transmission mode for the M data streams, the diversity order for data stream m, an outer loop backoff factor for data stream m, and so on. These different types of information are described below. Rate selector 184 computes an effective SNR for data stream m based on all of the received information, as described below. Rate selector 184 then selects a rate for data stream m based on the effective SNR and a look-up table (LUT) 186 that stores a set of rates supported by the MIMO system and their required SNRs. The selected rate for data stream m is included in the feedback information sent by main controller/processor 190 to transmitting station 110. At transmitting station 110, main controller/processor 140 receives the selected rate for data stream m and generates coding and modulation controls for data stream m. Data stream m is then processed in accordance with these controls by TX data processor 120, multiplexed with pilot symbols and spatially processed by TX spatial processor 130, conditioned by transmitter 132, and sent to receiving station 150.

Outer loop 220 estimates the received quality for data stream m and adjusts the operation of inner loop 210 for data stream m. The received data symbols are spatially processed by RX spatial processor 170, and the detected data symbols for data stream m are further processed (e.g., demodulated and decoded) by RX data processor 172. RX data processor 172 provides the status of each packet received for data stream m and/or decoder metrics for data stream m. A quality estimator 182 estimates the quality of data stream m based on all of the information from RX data processor 172 and controls the operation of inner loop 210 based on the quality estimate. In an embodiment, quality estimator 182 adjusts the outer loop backoff factor for data stream m. This outer loop backoff factor is used in the computation of the effective SNR for data stream m and thus influences the rate selection, as described below. In another embodiment, quality estimator 182 provides a rate adjustment for data stream m. This rate adjustment may direct inner loop 210 to select a lower rate for data stream m. The outer loop backoff factor and the rate adjustment are two mechanisms for controlling the operation of inner loop 210 and are described below.

FIG. 2 shows a specific embodiment of rate control mechanism 200. In another embodiment, receiving station 150 sends back the SNR estimates, effective SNRs, and/or some other indication of the received signal quality at receiving station 150. Transmitting station 110 then selects a rate for each data stream based on the information obtained from receiving station 150. In general, a rate control mechanism may be implemented in various manners. In an embodiment, rate control is achieved with both inner loop 210 and outer loop 220, as shown in FIG. 2. In another embodiment, rate control is achieved with just inner loop 210 or just outer loop 220.

The channel estimation and rate selection may be performed periodically, at scheduled times, before and/or during data transmission, whenever changes in the channel conditions are detected, and so on. The channel estimation, rate selection, and outer loop operation are described below.

Transmission Modes

The MIMO system may support multiple transmission modes (or spatial modes) for improved performance and greater flexibility. Table 1 lists some exemplary transmission modes and their short descriptions. The steered mode may also be called a beamforming mode, an eigensteering mode, a MIMO mode with beamforming, and so on. The unsteered mode may also be called a basic MIMO mode. The spatial spreading mode may also be called a pseudo-random transmit steering mode.

TABLE 1

| Transmission Mode | Description |
| --- | --- |
| Steered mode | Multiple data streams are transmitted on multiple orthogonal spatial channels (or eigenmodes) of a MIMO channel. |
| Unsteered mode | Multiple data streams are transmitted on multiple spatial channels (e.g., from multiple transmit antennas). |
| Spatial spreading | Multiple data streams are transmitted with spatial spreading to achieve similar performance for all data streams. |

Each transmission mode has different capabilities and requirements. The steered mode transmits data on the eigenmodes of a MIMO channel. The steered mode typically provides better performance but requires spatial processing at transmitting station 110 and receiving station 150. The unsteered mode requires no spatial processing at transmitting station 110. For example, transmitting station 110 may send one data stream from each transmit antenna. Performance for the unsteered mode is typically not as good as the steered mode. The spatial spreading mode transmits M data streams with different steering matrices so that these data streams observe an ensemble of effective channels. Consequently, the M data streams achieve similar performance, which is not dictated by the worst-case channel conditions. A suitable transmission mode may be selected based on the availability of channel state information, the capabilities of the transmitting and receiving stations, and so on.

For the steered mode, data is transmitted on S eigenmodes of the MIMO channel formed by the T transmit antennas and the R receive antennas. The MIMO channel may be characterized by an R×T channel response matrix H, which may be diagonalized to obtain the S eigenmodes of the MIMO channel. This diagonalization may be achieved by performing either singular value decomposition of H or eigenvalue decomposition of a correlation matrix of H, which is $R = H^H \cdot H$, where $H^H$ denotes the conjugate transpose of H. The eigenvalue decomposition of R may be given as:

$$R = H^H \cdot H = E \cdot \Lambda \cdot E^H, \quad \text{Eq. (1)}$$

where E is a T×T unitary matrix of eigenvectors of R; and
Λ is a T×T diagonal matrix of eigenvalues of R.

A unitary matrix E is characterized by the property $E^H \cdot E = I$, where I is the identity matrix. The columns of a unitary matrix are orthogonal to one another, and each column has unit power. Transmitting station 110 may perform transmitter spatial processing with the eigenvectors in E to transmit data on the S eigenmodes of H. Receiving station 150 may perform receiver spatial processing with the eigenvectors in E to recover the data transmitted on the S eigenmodes. The diagonal matrix Λ contains possible non-negative real values along the diagonal and zeros elsewhere. These diagonal entries are referred to as eigenvalues of H and represent the power gains for the S eigenmodes.

For a MIMO system with multiple subbands, the S eigenvalues for each subband k may be ordered from largest to smallest, so that the eigenmodes of the channel response matrix H(k) for subband k are ranked from highest SNR to lowest SNR. Wideband eigenmode m may be formed with the m-th eigenmode for each of the K subbands. The principal wideband eigenmode (with m=1) is associated with the largest eigenvalues for all K subbands, the second wideband eigenmode (with m=2) is associated with the second largest eigenvalues for all K subbands, and so on. S transmission channels may be formed with the S wideband eigenmodes.

Table 2 summarizes the spatial processing at transmitting station 110 and receiving station 150 for the three transmission modes. The same spatial processing may be performed for each subband.

mean square error (MMSE) technique. $\hat{s}$ is a T×1 vector of detected data symbols and is an estimate of s. The MMSE and CCMI techniques may be used for all three transmission modes. The MMSE and CCMI spatial filter matrices may be derived in the same manner for all three transmission modes, albeit with different effective channel response matrices $H_{es}$, $H_{us}$, and $H_{ss}$.

Successive interference cancellation (SIC) receiver processing may also be used to recover the M data streams in M stages. Each stage l detects one data stream using one of the receiver spatial processing techniques shown in Table 2, decodes the detected data symbol stream, estimates the interference caused by the decoded data stream on the remaining not yet recovered data streams, and cancels the estimated interference from the received symbol streams to obtain modified symbol streams for the next stage l+1. The next stage l+1 then detects, decodes, and cancels another data stream.

Regardless of which transmission scheme is selected for use, the system throughput may be significantly enhanced if receiving station 150 provides transmitting station 110 with timely and reasonably accurate information regarding what rates can be reliably sustained. Armed with this feedback information, transmitting station 110 can rapidly adapt to changes in the channel conditions.

SNR Estimation

The receiving station may estimate the received SNRs based on received pilot symbols and/or received data symbols. For pilot-based SNR estimation, the receiving station may use the received pilot symbols to estimate the received SNR for each spatial channel of each subband. The receiving station may use the received pilot symbols from (1) a clear pilot that is transmitted without any spatial processing in the unsteered mode, (2) a steered pilot that is transmitted on the eigenmodes with E in the steered mode, or (3) a spread pilot that is transmitted with V in the spatial spreading mode. The received SNRs for the three transmission modes may be computed as described below.

TABLE 2

| | Steered mode | Unsteered mode | Spatial spreading |
|---|---|---|---|
| Transmitting Station | $x_{es} = E \cdot s$ | $x_{us} = s$ | $x_{ss} = V \cdot s$ |
| Effective Channel | $H_{es} = H \cdot E$ | $H_{us} = H$ | $H_{ss} = H \cdot V$ |
| Received Symbols | | $r_x = H \cdot x_x + n = H_x \cdot s + n$ | |
| Receiver full-CSI/CCMI | $M_{fcsi}^{es} = \Lambda^{-1} \cdot E^H \cdot H^H$ $\hat{s}_{fcsi}^{es} = M_{fcsi}^{es} \cdot r_{es}$ | $M_{ccmi}^{us} = [H^H \cdot H]^{-1} \cdot H^H$ $\hat{s}_{ccmi}^{us} = M_{ccmi}^{us} \cdot r_{us}$ | $M_{ccmi}^{ss} = V^H \cdot M_{ccmi}^{us}$ $\hat{s}_{ccmi}^{ss} = M_{ccmi}^{ss} \cdot r_{ss}$ |
| Receiver MMSE | | $M_{mmse}^{x} = [H_x^H \cdot H_x + \sigma_{noise}^2 \cdot I]^{-1} \cdot H_x^H$ $D_{mmse}^{x} = [diag[M_{mmse}^{x} \cdot H_x]]^{-1}$ $\hat{s}_{mmse}^{x} = D_{mmse}^{x} \cdot M_{mmse}^{x} \cdot r_x$ | |

In Table 2, subscript "es" denotes the steered mode (or eigensteering), "us" denotes the unsteered mode, "ss" denotes the spatial spreading mode, and "x" may be "es", "us" or "ss". $\sigma_{noise}^2$ a is the variance of the AWGN noise for the MIMO channel. s is a T×1 vector with M data symbols to be sent on one subband in one symbol period and zeros for the remaining T−M elements. V is a T×T steering matrix used for spatial spreading. $x_x$ is a T×1 vector with T transmit symbols to be sent from the T transmit antennas on one subband in one symbol period for transmission mode x. $H_x$ is an R×T effective channel response matrix for transmission mode x. M is a T×R spatial filter matrix that may be derived based on a full channel state information (full-CSI) technique, a channel correlation matrix inversion (CCMI) technique, or a minimum For full-CSI receiver spatial processing in the steered mode, the received SNR for each eigenmode m of each subband k may be expressed as:

$$\gamma_{es,m}(k) = 10 \log_{10}\left(\frac{P_m(k) \cdot \lambda_m(k)}{\sigma_{noise}^2}\right), \quad \text{Eq. (2)}$$

for $m = 1, \ldots, S$ and $k = 1, \ldots, K$, where $P_m(k)$ is the transmit power for eigenmode m of subband k;
$\lambda_m$ is the m-th diagonal element of Λ(k) for subband k; and
$\gamma_{es,m}(k)$ is the received SNR for eigenmode m of subband k.

For MMSE receiver spatial processing in all three transmission modes, the received SNR for each spatial channel m of each subband k may be expressed as:

$$\gamma_{mmse,m}(k) = 10 \log_{10}\left(\frac{q_m(k)}{1-q_m(k)} P_m(k)\right), \quad \text{Eq. (3)}$$

for $m = 1, \ldots, S$ and $k = 1, \ldots, K$, where $q_m(k)$ is the m-th diagonal element of $M_{mmse}^x(k) \cdot H_x(k)$ for subband k; and $\gamma_{mmse,m}(k)$ is the received SNR for spatial channel m of subband k.

For CCMI receiver spatial processing in all three transmission modes, the received SNR for each spatial channel m of each subband k may be expressed as:

$$\gamma_{ccmi,m}(k) = 10 \log_{10}\left(\frac{P_m(k)}{r_m(k) \cdot \sigma_{noise}^2}\right), \quad \text{Eq. (4)}$$

for $m = 1, \ldots, S$ and $k = 1, \ldots, K$, where $r_m(k)$ is the m-th diagonal element of $R_x(k) = H_x^H(k) \cdot H_x(k)$ for subband k; and $\gamma_{ccmi,m}(k)$ is the received SNR for spatial channel m of subband k.

In equations (2) through (4), the quantity $P_m(k)/\sigma_{noise}^2$ is the SNR (in linear units) prior to the receiver spatial processing. The quantities $\gamma_{es,m}(k)$, $\gamma_{mmse,m}(k)$, and $\gamma_{ccmi,m}(k)$ are the SNRs (in units of decibel (dB)) after the receiver spatial processing, which are the received SNRs.

For the spatial spreading mode, the S spatial channels achieve similar received SNRs because of the spatial spreading by matrix V. Consequently, the same rate may be used for the M data streams. With spatial spreading, each data symbol is transmitted on all S spatial channels and observes an average SNR for all spatial channels, which may be expressed as:

$$\gamma_{mmse}(k) = 10 \log_{10}\left(\sum_{m=1}^{S} \frac{q_m(k)}{1-q_m(k)} P_m(k)\right), \quad \text{and} \quad \text{Eq. (5)}$$

$$\gamma_{ccmi}(k) = 10 \log_{10}\left(\sum_{m=1}^{S} \frac{P_m(k)}{r_m(k) \cdot \sigma_{noise}^2}\right). \quad \text{Eq. (6)}$$

The SNR averaging may be in linear unit, as shown in equations (5) and (6), or in dB.

The received SNR for each data stream may also be estimated based on the received data symbols for that data stream. For data-based SNR estimation, the receiving station performs receiver spatial processing on the received data symbols with the spatial filter matrix for each subband to obtain detected data symbols. Each detected data symbol is typically a multi-bit value (or a soft-decision) that is an estimate of a transmitted data symbol. The receiving station may convert the detected data symbols to hard decisions, determine the difference between the hard and soft decisions for each detected data symbol, and compute an average of the magnitude squares of the difference between the hard and soft decisions. The receiving station may derive a data-based SNR estimate for each data stream based on the average of the magnitude squares of the difference between the hard and soft decisions for that data stream.

The pilot is typically transmitted such that pilot-based SNR estimates may be obtained for all S spatial channels of each subband, even if data is transmitted on fewer than S spatial channels. Data-based SNR estimates may be obtained for the M data streams that are actually transmitted. In general, the rates for the data streams may be selected based on just pilot-based SNR estimates, just data-based SNR estimates, or both pilot-based SNR estimates and data-based SNR estimates. Using both pilot-based SNR estimates and data-based SNR estimates may be advantageous if neither type of SNR estimates alone accurately reflects the rate that can be reliably supported by the MIMO channel. A discrepancy between the pilot-based SNR estimates and the data-based SNR estimates may be indicative of impairments at the transmitting station and/or receiving station. In an embodiment, if such a discrepancy is detected, then the smaller or the average of the two types of SNR estimates may be used to select the rates for the data streams.

Rate Selection

Rate selection may entail selecting a transmission mode to use for transmission if multiple transmission modes are supported, selecting the number of data streams to transmit, and selecting a rate for each data stream or a set of rates for all data streams. These three parameters (transmission mode, number of data streams, and rate) are typically inter-related. For example, the transmission mode selected for use may affect the SNR estimates, which may in turn affect the rates selected for the data streams. Different combinations of transmission mode and number of data streams may be evaluated. Each combinations corresponds to a specific transmission mode and a specific number of data streams. For each combination, the rate for each data stream may be determined, and the overall throughput for all data streams may be computed. The combination with the highest overall throughput may be selected for use. One combination for a specific transmission mode and M data streams may be evaluated as described below.

The rate for each data stream may be selected in various manners. For clarity, an embodiment of rate selection is described below. For this embodiment, the received SNRs for the spatial channels and subbands used for each data stream are initially determined. The following description assumes that data stream m is sent on transmission channel m, which is a wideband spatial channel composed of spatial channel m for each of the K subbands. The received SNRs for each wideband spatial channel are typically frequency dependent and are further dependent on the transmission mode used for data transmission and the receiver spatial processing technique, as described above. The received SNR for each subband k used for data stream m is denoted as $\gamma_m(k)$ and is given in units of dB. $\gamma_m(k)$ may be computed based on the transmission mode and the receiver spatial processing technique, as described above.

The average SNR for each data stream may be computed as:

$$\gamma_{avg,m} = \frac{1}{K} \cdot \sum_{k=1}^{K} \gamma_m(k), \quad \text{for } m = 1, \ldots, M, \quad \text{Eq. (7)}$$

where $\gamma_{avg,m}$ is the average SNR for data stream m, in units of dB.

The variance of the received SNRs for each data stream may be computed as:

$$\sigma_{snr,m}^2 = \frac{1}{(K-1)} \cdot \sum_{k=1}^{K} (\gamma_m(k) - \gamma_{avg,m})^2, \quad \text{Eq. (8)}$$

for $m = 1, \ldots, M,$ where $\sigma_{snr,m}^2$ is the SNR variance for data stream m.

An SNR variability backoff factor may be computed for each data stream based on the average SNR and the SNR variance for that data stream, as follows:

$$\gamma_{os,m} = K_{snr} \cdot \sigma_{snr,m}^2, \text{ for } m=1, \ldots, M, \qquad \text{Eq. (9)}$$

where $\gamma_{os,m}$ is the SNR variability backoff factor for data stream m; and
$K_{snr}$ is a constant that is described below.

In general, the SNR variability backoff factor may be computed based on any function of average SNR and SNR variance, or $\gamma_{os,m} = F(\gamma_{avg,m}, \sigma_{snr,m}^2)$.

A MIMO backoff factor used to account for MIMO transmission in the steered mode may be defined as:

$$\gamma_{mimo,m}^{es} = \frac{m \cdot \beta}{D}, \qquad \text{Eq. (10)}$$
$$\text{for } m = 1, \ldots, M,$$

where β is a positive constant that is described below;
D is the diversity order for the data transmission; and
$\gamma_{mimo,m}^{es}$ is the MIMO backoff factor for data stream m in the steered mode.

The data stream index m may be included in equation (10) or omitted from the equation. The diversity order is indicative of the amount of spatial diversity observed by a data transmission through the use of multiple receive antennas. The diversity order for the steered mode may be given as:

$$D = R - M + 1. \qquad \text{Eq. (11)}$$

A MIMO backoff factor for the unsteered mode and the spatial spreading mode, without successive interference cancellation at the receiving station, may be defined as:

$$\gamma_{mimo,m}^{ss} = \gamma_{mimo,m}^{us} = \frac{\beta}{D}, \qquad \text{Eq (12)}$$
$$\text{for } m = 1, \ldots, M,$$

A MIMO backoff factor for the unsteered mode and the spatial spreading mode, with successive interference cancellation at the receiving station, may be defined as:

$$\gamma_{mimo,m}^{sic} = \frac{\beta}{D(m)}, \qquad \text{Eq. (13)}$$
$$\text{for } m = 1, \ldots, M,$$

where D(m) is the diversity order observed by data stream m, which may be given as:

$$D(m) = R - M + m, \text{ for } m=1, \ldots, M. \qquad \text{Eq. (14)}$$

Equation (14) assumes that the M data streams are detected and decoded in order, so that data stream m=1 is detected and decoded first, then data stream m=2, and so on. If the interference estimation and cancellation are successful for a given data stream m, then the diversity order for each subsequent data stream increases, as if data stream m was not transmitted. For example, if R=4 and M=3, then data stream m=1 observes a diversity order of two, data stream m=2 observes a diversity order of three, and data stream m=3 observes a diversity order of four.

The effective SNR for each data stream may then be computed as:

$$\gamma_{eff,m} = \gamma_{avg,m} - \gamma_{os,m} - \gamma_{mimo,m} - \gamma_{outer,m}, \text{ for } m=1, \ldots, M, \qquad \text{Eq. (15)}$$

where $\gamma_{outer,m}$ is an outer loop backoff factor for data stream m (described below);
$\gamma_{mimo,m}$ is a MIMO backoff factor for data stream m; and
$\gamma_{eff,m}$ is the effective SNR for data stream m.

In equation (9), factor $K_{snr}$ accounts for variability in the received SNRs for a data stream. This SNR variability may arise due to frequency selectivity of the communication link, which is a non-flat frequency response that results in varying received SNRs across the K subbands. Factor $K_{snr}$ reduces the effective SNR from the average SNR to take into account the fact that decoding performance for some error correction codes degrades if there is a large variation in the SNRs for the soft decisions being decoded. If factor $K_{snr}$ is not applied, then the PER for the data stream may be elevated. Factor $K_{snr}$ may be selected based on specific details of the error correction code used for the data stream such as, e.g., the type of error correction code, the constraint length, and so on. The factor $K_{snr}$ may also be a function of the code rate.

In equations (10) through (14), the MIMO backoff factor accounts for various characteristics associated with MIMO transmission. The MIMO backoff factor is derived based on factor β, stream index m, and diversity order D, which are discussed below.

Factor β is used to reduce the effective SNR to account for rate mismatches that may occur due to the following:
1. Latency in the feedback from receiving station 150 to transmitting station 110;
2. Noise in the communication link and SNR per stream estimation process; and
3. Misalignment of the steering vectors used by transmitting station 110 and/or receiving station 150 to the MIMO channel in the steered mode.

Factor β is typically a positive constant. Factor β may also be made a function of the received SNRs, the coherence time of the MIMO channel, the feedback delay, and so on, or any combination thereof.

The diversity order D accounts for the amount of spatial diversity achieved for the data transmission. The lowest diversity order is achieved when R=M, which gives a diversity order of one, or D=1. As more receive antennas are used for a given number of data streams, the diversity order increases. A higher diversity order typically corresponds to less variation in the received SNRs for each data stream. The division by D in equations (10), (12) and (13) accounts for the fact that the received SNRs of the data streams are generally better behaved when the number of data streams being transmitted is less than the number of receive antennas. In general, as the diversity order D increases, a lower MIMO backoff factor may be used.

The stream index m accounts for the fact that different data streams may have different amounts of SNR variability in the steered mode. The principal wideband eigenmode has the highest average SNR and typically also has less SNR variability across time and frequency. Hence, a smaller MIMO backoff factor may be used for the principal wideband eigenmode. The S-th wideband eigenmode has the lowest average SNR and typically has more SNR variability across time and frequency. Hence, a larger MIMO backoff factor may be used for this wideband eigenmode.

The effective SNR may also be derived in a manner to account for other factors. For example, a factor L may be used to account for variations in the length of the packets sent on the data streams. A larger packet typically requires a higher SNR to achieve a given PER. Variations in packet size may be handled by adding a packet-length dependent backoff factor, e.g., in equation (15).

The various factors described above (e.g., $K_{snr}$ and $\beta$) may be selected to maximize throughput and minimize packet error rate. These factors may be determined based on computation simulation, empirical measurements, and so on.

In one rate selection embodiment, a rate may be independently selected for each data stream from among a set of rates supported by the system. Table 3 lists an exemplary set of 14 rates supported by the system, which are given rate indices 0 through 13. Each rate is associated with a specific spectral efficiency (Spectral Eff), a specific code rate, a specific modulation (Mod) scheme, and a specific minimum SNR (Req SNR) required to achieve 1% PER for a non-fading, AWGN channel. The spectral efficiency refers to the data rate (or information bit rate) normalized by the system bandwidth, and is given in units of bits per second per Hertz (bps/Hz). The code rate and modulation scheme for each rate in Table 3 are for a specific system design. The rate having index 0 is for a null data rate (or no data transmission). For each rate with a non-zero data rate, the required SNR is obtained based on the specific system design (e.g., the code rate, interleaving scheme, modulation scheme, and so on, used by the system for that rate) and for an AWGN channel. The required SNR may be obtained by computation, computer simulation, empirical measurements, and so on.

TABLE 3

| Rate Index | Spectral Eff (bps/Hz) | Code Rate | Mod Scheme | Req SNR (dB) |
|---|---|---|---|---|
| 0 | 0.0 | — | — | — |
| 1 | 0.25 | 1/4 | BPSK | −1.8 |
| 2 | 0.5 | 1/2 | BPSK | 1.2 |
| 3 | 1.0 | 1/2 | QPSK | 4.2 |
| 4 | 1.5 | 3/4 | QPSK | 6.8 |
| 5 | 2.0 | 1/2 | 16 QAM | 10.1 |
| 6 | 2.5 | 5/8 | 16 QAM | 11.7 |
| 7 | 3.0 | 3/4 | 16 QAM | 13.2 |
| 8 | 3.5 | 7/12 | 64 QAM | 16.2 |
| 9 | 4.0 | 2/3 | 64 QAM | 17.4 |
| 10 | 4.5 | 3/4 | 64 QAM | 18.8 |
| 11 | 5.0 | 5/6 | 64 QAM | 20.0 |
| 12 | 6.0 | 3/4 | 256 QAM | 24.2 |
| 13 | 7.0 | 7/8 | 256 QAM | 26.3 |

Referring to FIG. 2, look-up table (LUT) 186 may store the set of supported rates and the required SNR for each supported rate. The effective SNR for each data stream may be provided to look-up table 186 and compared against the set of required SNRs for the set of supported rates. Look-up table 186 may then provide a selected rate for each data stream, which is the rate with the highest spectral efficiency and a required SNR that is less than or equal to the effective SNR for that data stream.

For clarity, the rate selection process is described below for a specific example. For this example, data stream m is transmitted on transmission channel m with four subbands having received SNRs of 2.74, 4.27, 6.64, and 9.52 dB. The average SNR is computed as $\gamma_{avg,m}=5.79$ dB, and the SNR variance is computed as $\sigma_{snr,m}^2=8.75$. For this example, the SNR variability backoff factor is determined based on a function $\gamma_{os,m}=F(\gamma_{avg,m}, \sigma_{snr,m}^2)=0.25 \cdot \sigma_{snr,m}^2$ and is computed as $\gamma_{os,m}=2.19$ dB. For this example, the MIMO backoff factor is given as $\gamma_{mimo,m}=1.0$ dB, and the outer loop backoff factor is $\gamma_{outer,m}=0.5$. The effective SNR is then computed as $\gamma_{op}=5.79-2.19-1.0-0.5=2.10$ dB.

Using the set of supported rates and their required SNRs shown in Table 3, the rate with index 2 is selected for data stream m. The selected rate has the highest required SNR (of 1.2 dB) that is less than or equal to the effective SNR (of 2.10 dB). The selected rate indicates that a spectral efficiency of 0.5 bps/Hz, a code rate of 1/2, and BPSK modulation are used for data stream m.

As shown in equations (2) through (4), the received SNRs are dependent on the transmit power $P_m(k)$ used for each spatial channel of each subband. In an embodiment, the total transmit power, $P_{total}$, is allocated equally to the M data streams so that $P_m(k)=P_{total}/(K \cdot M)$ for m=1, ..., M and k=1, ..., K. A rate may then be selected for each of the M data streams as described above for equations (7) through (15). In another embodiment, the total transmit power, $P_{total}$, is allocated unequally to the M data streams. For example, the total transmit power, $P_{total}$, may be allocated using water-filling so that data streams with higher SNRs are allocated more transmit power.

In an embodiment, the number of data streams to transmit, M, is selected to achieve the highest overall throughput. For this embodiment, the overall throughput may be computed for each of the possible numbers of data streams. For one data stream, the received SNRs for this data stream is computed with the total transmit power $P_{total}$ being allocated to this data stream, the effective SNR is computed as described above and used to select a rate for the data stream, and the overall throughput is equal to the spectral efficiency for the selected rate. For s data streams, where $1<s \leq S$, the received SNRs for each data stream are computed with $P_{total}/s$ being allocated to each data stream, the effective SNR for each data stream is computed as described above and used to select a rate for the data stream, and the overall throughput is equal to the sum of the spectral efficiencies for the selected rates for all s data streams. The highest overall throughput among the S overall throughputs computed for the S possible numbers of data streams is determined, and the number of data streams that provides this highest overall throughput is selected as M. In evaluating the overall throughput for each hypothesized number of data streams, the received SNRs are computed based on the transmission mode selected for use and the receiver processing technique used to detect the data streams.

In an embodiment, a transmission mode is selected based on equations (7) through (15). For example, the overall throughput may be computed for each of the supported transmission modes. The transmission mode with the highest overall throughput may be selected for use. A transmission mode may also be selected based on other factors such as, for example, the capabilities of the transmitting and receiving stations, the coherence time of the MIMO channel, the feedback delay, and so on.

In another rate selection embodiment, the rates for the M data streams are selected jointly from a vector-quantized rate set, which may also be called a modulation coding scheme (MCS) set. The system may support only certain combinations of rates, e.g., in order to reduce the amount of feedback information to send back to the transmitting station. Table 4 shows an exemplary vector-quantized rate set for a system in which the transmitting station can transmit up to four data streams. For this rate set, rate identifiers (IDs) 0 through 13 are for transmission of one data stream and are given in Table 3 as rate indices 0 through 13, respectively, rate IDs 14 through 24 are for transmission of two data streams, rate IDs 25 through 35 are for transmission of three data streams, and rate IDs 36 through 43 are for transmission of four data streams. For each rate ID, the number of data streams to transmit (Num Str), the rate to use for each data stream, and the overall throughput (OTP) are given in Table 4. As an example, for rate ID 31, the overall throughput is 12.0 bps/Hz, three data streams are transmitted, rate 12 (code rate 3/4 and 256 QAM) is used for data stream 1, rate 9 (code rate 2/3 and 64 QAM) is used for data stream 2, and rate 5 (code rate 1/2 and 16 QAM) is used for data stream 3.

TABLE 4

| Rate ID | OTP bps/Hz | Num Str | Rate for Stream 1 | 2 | 3 | 4 |
|---|---|---|---|---|---|---|
| 14 | 2.0 | 2 | 4 | 2 | — | — |
| 15 | 2.5 | 2 | 4 | 3 | — | — |
| 16 | 3.0 | 2 | 5 | 3 | — | — |
| 17 | 4.0 | 2 | 7 | 3 | — | — |
| 18 | 4.5 | 2 | 7 | 4 | — | — |
| 19 | 4.5 | 2 | 9 | 2 | — | — |
| 20 | 6.0 | 2 | 10 | 4 | — | — |
| 21 | 6.0 | 2 | 9 | 5 | — | — |
| 22 | 8.0 | 2 | 12 | 5 | — | — |
| 23 | 9.0 | 2 | 12 | 7 | — | — |
| 24 | 12.0 | 2 | 12 | 12 | — | — |
| 25 | 6.0 | 3 | 7 | 5 | 3 | — |
| 26 | 6.0 | 3 | 9 | 4 | 2 | — |
| 27 | 8.0 | 3 | 10 | 5 | 4 | — |
| 28 | 9.0 | 3 | 10 | 7 | 4 | — |
| 29 | 9.0 | 3 | 10 | 9 | 2 | — |
| 30 | 12.0 | 3 | 10 | 10 | 7 | — |
| 31 | 12.0 | 3 | 12 | 9 | 5 | — |
| 32 | 12.0 | 3 | 12 | 10 | 4 | — |
| 33 | 13.5 | 3 | 12 | 10 | 7 | — |
| 34 | 13.5 | 3 | 12 | 12 | 4 | — |
| 35 | 16.0 | 3 | 12 | 12 | 9 | — |
| 36 | 8.0 | 4 | 9 | 7 | 2 | 2 |
| 37 | 12.0 | 4 | 10 | 10 | 5 | 3 |
| 38 | 16.0 | 4 | 12 | 10 | 9 | 4 |
| 39 | 16.0 | 4 | 12 | 10 | 10 | 3 |
| 40 | 16.0 | 4 | 12 | 12 | 7 | 3 |
| 41 | 18.0 | 4 | 12 | 12 | 9 | 5 |
| 42 | 18.0 | 4 | 12 | 12 | 10 | 4 |
| 43 | 21.0 | 4 | 12 | 12 | 12 | 7 |

The rates for the M data streams may be selected based on the effective SNRs and the vector-quantized rate set in various manners. In an embodiment, a rate combination is selected for the M data streams such that the required SNR for the rate for each data stream is less than or equal to the effective SNR for that data stream. In another embodiment, a rate combination with the highest possible overall throughput is selected for the M data streams such that the total SNR margin is non-negative. For this embodiment, the rate combinations in the rate set may be evaluated one at a time, starting with the rate combination having the highest overall throughput. For each rate combination, the SNR margin for each data stream is computed as the difference between the required SNR and the effective SNR for that data stream. The SNR margins for all data streams are summed to obtain the total SNR margin. The rate combination is selected if the total SNR margin his non-negative. In another embodiment, a rate combination with the highest overall throughput is selected for the M data streams such that the total required SNR is less than or equal to the total effective SNR. For each rate combination, the total required SNR may be computed as the sum of the required SNRs for all of the rates in that rate combination. The total effective SNR may be computed as the sum of the effective SNRs for all of the data streams. A rate combination may also be selected in other manners.

Outer Loop Update

For the embodiment shown in FIG. 2, outer loop 220 maintains a target PER for each data stream. The outer loop for each data stream may be driven by packet errors for that data stream. In an embodiment, whenever a packet is decoded in error (which is an erased packet), the outer loop increases the outer loop backoff factor $\gamma_{outer,m}$ by a positive step size $\delta_m$. Whenever a packet is decoded correctly (which is a good packet), the outer loop decreases the outer loop backoff factor towards zero by subtracting a fraction of $\delta_m$. The updating of the outer loop for data stream m may be expressed as:

If packet error, $\gamma_{outer,m}(n) = \gamma_{outer,m}(n-1) + \delta_m$, Eq. (16a)

If no packet error, $\gamma_{outer,m}(n) = \max\{0, \gamma_{outer,m}(n-1) - P_m \cdot \delta_m\}$, Eq. (16b)

where $P_m$ is the fraction of $\delta_m$ to be subtracted for each good packet; and $\gamma_{outer,m}(n)$ is the outer loop backoff factor for packet n in data stream m.

For the embodiment shown in equation set (16), the outer loop backoff factor is a non-negative value. The outer loop backoff factor may be initialized at the start of data transmission to a predetermined value, e.g., to zero or to a negative value to account for a high initial estimate of the received SNRs. The outer loop backoff factor is thereafter updated based on the status of the received packets. The outer loop backoff factor is incremented by $\delta_m$ for each erased packet and decremented by $P_m \cdot \delta_m$ for each good packet, where $P_m \cdot \delta_m$ is a fraction of $\delta_m$ and $\gamma_{outer,m}(n)$ is constrained to be zero or greater.

The factor $P_m$ may be set based on the target PER for data stream m and may be expressed as:

$$P_m = \frac{PER_m}{1 - PER_m}, \quad \text{Eq. (17)}$$

where $PER_m$ is the target PER for data stream m. For example, if $PER_m = 0.01$ for 1% PER, then $P_m = 0.0101 = 1/99$. The outer loop step size $\delta_m$ determines the rate of convergence for the outer loop.

For the embodiment described above, the outer loop backoff factor $\gamma_{outer,m}(n)$ is dependent on the data stream, as indicated by subscript "m" in equations (16a), (16b), and (17). This embodiment may be used for a system in which each data stream is encoded separately and each packet is sent on one data stream. The outer loop backoff factor for each data stream may be updated based on the status of the packets received for that data stream.

A system may send a single packet across multiple data streams and these data streams may be considered to be jointly encoded. For example, a packet may be parsed or demultiplexed into M blocks of the same or different sizes, and each block may be sent on a different data stream. The receiving station may attempt to recover the packet based on the M blocks received on the M data streams. If there is a packet error, it may be difficult to determine which one(s) of the M data streams causes the packet error.

In an embodiment, for a system with jointly encoded data streams, an SNR margin may be maintained for each data stream. The SNR margin for data stream m may be computed as the difference between the required SNR for the selected rate and the effective SNR for data stream m. The effective SNR for data stream m may be obtained with pilot-based and/or data-based SNR estimates. Whenever a packet error is detected, the outer loop backoff factor for the data stream with the lowest SNR margin is increased, e.g., as shown in equation (16a). The data stream with the smallest SNR margin is thus assumed to have caused the packet error, and its outer loop backoff factor is increased accordingly. Whenever a good packet is received, the outer loop backoff factors for all data streams are decreased, e.g., as shown in equation (16b).

If all data streams have similar SNR margins, which may be the case for the spatial spreading mode, then the outer loop backoff factors for all data streams may be adjusted up or down for an erased or good packet, respectively. In another embodiment, the outer loop may select the next lower rate for each data stream having a negative SNR margin.

The outer loop may also provide other types of information used to control the operation of inner loop 210. In an embodiment, the outer loop may provide a rate adjustment for each data stream m. This rate adjustment may direct the inner loop for data stream m to select a lower rate for data stream. This rate adjustment may be generated due to unsatisfactory performance, e.g., a burst of packet errors received for data stream m.

In an embodiment, the outer loop may use decoder metrics such as a re-encoded symbol error rate (SER), a re-encoded power metric, a modified Yamamoto metric (for a convolutional decoder), a minimum or average log-likelihood ratio (LLR) among the bits in a decoded packet (for a Turbo decoder), and so on. The re-encoded SER is the error rate between the detected data symbols from RX spatial processor 170 and re-encoded symbols obtained by re-encoding and re-modulating the decoded data from RX data processor 172. The modified Yamamoto metric is indicative of the confidence in the decoded data and is obtained based on the difference between the selected (best) path through the trellis for the convolutional decoding and the next closest path through the trellis. The minimum or average LLR may also be used as an indication of the confidence of the decoded data. These decoder metrics are indicative of the quality of a received data transmission and are known in the art.

The outer loop backoff factor and/or the rate for each data stream may be adjusted based on the packet errors and/or decoder metrics for that data stream. The decoder metrics for each data stream may be used to estimate the performance of the data stream. If a decoder metric for a given data stream is worse than a threshold selected for that metric, then the outer loop backoff factor and/or the rate for that data stream may be adjusted accordingly.

The outer loop may also adjust the operation of the inner loop in other manners, and this is within the scope of the invention. In general, the update rate for the outer loop may be slower or faster than the update rate for the inner loop. For example, the outer loop may adjust the outer loop backoff factor based on a predetermined number (or a block) of received packets. The outer loop may also adjust the rate between inner loop updates. The outer loop typically has more influence on the operation of the inner loop for longer data transmissions than for bursty transmissions.

Figure 3:
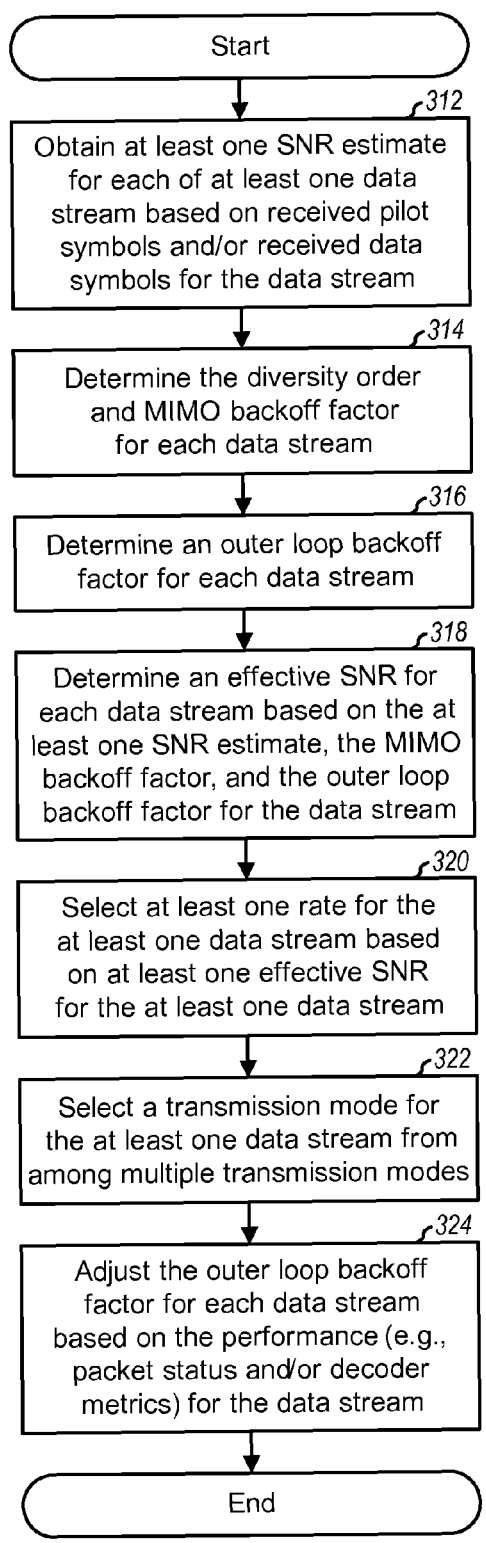
FIG. 3 shows a process for performing rate control in a MIMO system.

The illustration of FIG. 3 shows an embodiment of a process 300 for performing rate control in a MIMO system. Process 300 may be performed by receiving station 150, transmitting station 110, or both stations 110 and 150.

At least one SNR estimate is obtained for each of at least one data stream based on received pilot symbols and/or received data symbols for the data stream (block 312). The SNR estimates may be derived in accordance with the receiver spatial processing technique used for the at least one data stream, e.g., as shown in equations (2) through (6). The diversity order and MIMO backoff factor are determined for each data stream (block 314). An outer loop backoff factor is also determined for each data stream (block 316). An effective SNR is determined for each data stream based on the at least one SNR estimate, the MIMO backoff factor, and the outer loop backoff factor for that data stream (block 318).

At least one rate is then selected for the at least one data stream based on the at least one effective SNR for the at least one data stream (block 320). The rate for each data stream may be independently selected based on the effective SNR for that data stream. Alternatively, a rate combination may be selected for the at least one data stream based on the at least one effective SNR. A transmission mode may also be selected for the at least one data stream from among multiple transmission modes (e.g., the steered, unsteered, and spatial spreading modes) associated with different transmitter spatial processing (322).

The outer loop backoff factor for each data stream is adjusted based on the performance (e.g., packet status and/or decoder metrics) for the data stream (block 324). The outer loop backoff factor for each data stream may be adjusted independently if each packet is sent on one data stream. The outer loop backoff factor(s) for the at least one data stream may also be adjusted jointly if a packet may be sent on multiple data streams, as described above.

Figure 4:
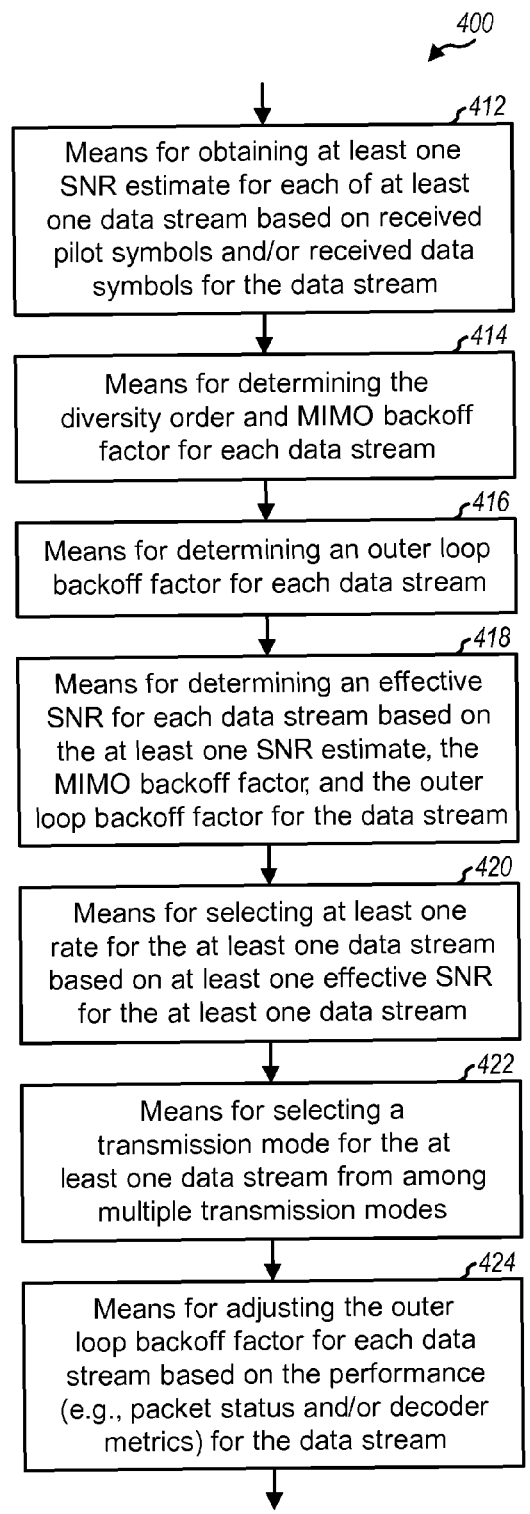
FIG. 4 shows an apparatus for performing rate control in the MIMO system.

The illustration of FIG. 4 shows an embodiment of an apparatus 400 for performing rate control in a MIMO system. Apparatus 400 may reside at receiving station 150 or transmitting station 110. Alternatively, a portion of apparatus 400 may reside at receiving station 150, and the remaining portion of apparatus 400 may reside at transmitting station 110.

Apparatus 400 includes means for obtaining at least one SNR estimate for each of at least one data stream based on received pilot symbols and/or received data symbols for the data stream (block 412), means for determining the diversity order and MIMO backoff factor for each data stream (block 414), means for determining an outer loop backoff factor for each data stream (block 416), and means for determining an effective SNR for each data stream based on the at least one SNR estimate, the MIMO backoff factor, and the outer loop backoff factor for the data stream (block 418). Apparatus 400 further includes means for selecting at least one rate for the at least one data stream based on the at least one effective SNR for the at least one data stream (block 420) and means for selecting a transmission mode for the at least one data stream from among multiple transmission modes (422). Apparatus 400 further includes means for adjusting the outer loop backoff factor for each data stream based on the performance for the data stream (block 424).

The rate control techniques described herein may be implemented by various means. For example, these techniques may be implemented in hardware, firmware, software, or a combination thereof. For a hardware implementation, the processing units used for rate control at a receiving station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used for rate control at a transmitting station may also be implemented within one or more ASICs, DSPs, processors, and so on.

For a firmware or software implementation, the rate control techniques may be implemented with modules (e.g., procedures, functions, and so on) that perform the functions described herein. The software codes may be stored in a memory unit (e.g., memory unit 142 or 192 in FIG. 1) and executed by a processor (e.g., processor 140 or 190). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for rate selection in a wireless communications system comprising:
    at least one processor configured to obtain at least one SNR estimate for a data stream, to determine a diversity order for the data stream based on a number of data streams being transmitted and a number of receive antennas, to determine an SNR variance for the data stream, and to select a rate for the data stream based on the at least one SNR estimate, the diversity order for the data stream, and the SNR variance for the data stream; and
    a memory coupled to the at least one processor.

2. The apparatus of claim 1, wherein the at least one processor is configured to derive the at least one SNR estimate based on received pilot symbols.

3. The apparatus of claim 1, wherein the at least one processor is configured to derive the at least one SNR estimate based on received data symbols.

4. The apparatus of claim 1, wherein the at least one processor is configured to determine the diversity order for the data stream further based on an index for the data stream.

5. A method for rate selection by a station in a wireless communications system comprising:
    obtaining at least one SNR estimate for a data stream;
    determining a diversity order for the data stream based on a number of data streams being transmitted and a number of receive antennas;
    determining an SNR variance for the data stream; and
    selecting a rate for the data stream based on the at least one SNR estimate, the diversity order for the data stream, and the SNR variance for the data stream.

6. The method of claim 5, wherein the obtaining comprises deriving the at least one SNR estimate based on received pilot symbols.

7. The method of claim 5, wherein the obtaining comprises deriving the at least one SNR estimate based on received data symbols.

8. The method of claim 5, wherein the determining comprises determining the diversity order for the data stream further based on an index for the data stream.

9. An apparatus for rate selection by a station in a wireless communications system comprising:
    means for obtaining at least one SNR estimate for a data stream;
    means for determining a diversity order for the data stream based on a number of data streams being transmitted and a number of receive antennas;
    means for determining an SNR variance for the data stream; and
    means for selecting a rate for the data stream based on the at least one SNR estimate, the diversity order for the data stream, and the SNR variance for the data stream.

10. The apparatus of claim 9, wherein the means for obtaining comprises means for deriving the at least one SNR estimate based on received pilot symbols.

11. The apparatus of claim 9 wherein the means for obtaining comprises means for deriving the at least one SNR estimate based on received data symbols.

12. The apparatus of claim 9, wherein the means for determining comprises means for determining the diversity order for the data stream further based on an index for the data stream.

13. A memory unit for rate selection by a station in a wireless communications system including one or more software modules stored therein, the one or more software modules including software codes and being executable by one or more processors, the software codes comprising:
    code for obtaining at least one SNR estimate for a data stream;
    code for determining a diversity order for the data stream based on a number of data streams being transmitted and a number of receive antennas;
    code for determining an SNR variance for the data stream; and
    code for selecting a rate for the data stream based on the at least one SNR estimate, the diversity order for the data stream, and the SNR variance for the data stream.

14. The memory unit of claim 13, wherein the code for obtaining comprises code for deriving the at least one SNR estimate based on received pilot symbols.

15. The memory unit of claim 13, wherein the obtaining comprises deriving the at least one SNR estimate based on received data symbols.

16. The memory unit of claim 13, wherein the code for determining comprises code for determining the diversity order for the data stream further based on an index for the data stream.

* * * * *